Patented Jan. 4, 1944

2,338,166

UNITED STATES PATENT OFFICE 2,338,166

ART OF BITUMEN ROAD-MAKING AND THE LIKE

Amund Birger Carl Dahlberg, Stockholm, Sweden

No Drawing. Application December 27, 1938, Serial No. 247,953. In Sweden October 14, 1938

2 Claims. (Cl. 106—269)

This invention relates to a method of improving the bond between bitumen and surfaces of acid character in bituminizing roads and in the manufacture of bituminous road making compositions.

In the copending application Ser. No. 70,701, now Patent No. 2,192,284, dated March 5, 1940, a method of manufacturing a bituminous road making composition is described in which gravel, sand and other mineral substances rich in silica and other substances of a substantially acid character are subjected to a preliminary treatment in order to improve the bond between the mineral substance and the bitumen. According to said method the acid mineral substance is first treated with a basic material, for instance a compound of calcium, magnesium or aluminium, capable of chemically attacking the surfaces of the acid mineral bodies in presence of water to form salts and also capable of forming soaps practically insoluble in water with saponifiable substances such as a fatty acid, for example, oleic acid or a resin, then, after the chemical reaction between the added basic material and the mineral substance has taken place, a saponifiable substance is added to form a soap practically insoluble in water on the acid mineral bodies, and finally a bituminous binder is added. In said copending application an analogous method of bituminizing roads is described with the object of improving the bond between the bitumen and the road surface.

It has been found that when the basic material consists of an hydroxide, the chemical reactions characteristic for the above-mentioned method between the basic material and the mineral bodies on one hand and between the basic material and the saponifiable substance on the other hand are intensified and accelerated by forming the hydroxide directly on the surfaces of the acid mineral bodies, the reactions taking place in such case practically in the moment when the hydroxide is formed. This forming of the hydroxide, for instance calcium hydroxide, on the surfaces of acid mineral bodies may be effected by applying to said bodies a basic material in the form of an oxide, a carbide or a hydrolysable salt in dry state or suspended in a liquid free from water, such as crystal oil or other mineral oil, and then converting said basic material into hydroxide by means of water and thus bringing it to react with the silica or silica compounds in the surfaces of the acid mineral bodies. The reaction with the acid mineral bodies occurs then in the moment when the hydroxide is formed and takes place rapidly and with great intensity. It is, therefore, not necessary to apply the saponifiable substance, for example, oleine, separately to form the insoluble soap before the bitumen is added but according to the present invention said substance is added simultaneously with the bitumen, for instance dissolved or suspended therein without the necessity of waiting any considerable time for the reaction between the basic material and the acid mineral. The whole procedure can thus be performed continuously without any essential intermissions between the different stages.

What I claim is:

1. The method of improving the bond between a bituminous binder and bodies of mineral aggregate of acid character in bituminizing roads and in preparing bituminous road making compositions, comprising applying to the acid mineral aggregate a basic material, free from water, capable of forming with water a hydroxide capable of chemically attacking the acid mineral bodies to form on the surfaces of said bodies a substance capable of reacting with saponifiable substances to form a substantially water-insoluble soap, converting said basic material to a hydroxide by reaction with water directly on the surfaces of the acid aggregate bodies, and then applying to the aggregate a saponifiable substance and bitumen simultaneously.

2. The method of improving the bond between a bituminous binder and bodies of mineral aggregate of acid character in bituminizing roads and in preparing bituminous road making compositions, comprising applying to the acid mineral aggregate a basic material, free from water, of the group consisting of an oxide of calcium, magnesium, and aluminum capable of forming with water a hydroxide capable of chemically attacking the acid mineral bodies to form on the surfaces of said bodies a substance capable of reacting with saponifiable substances to form a substantially water-insoluble soap, converting said basic material to a hydroxide by reaction with water directly on the surfaces of the acid aggregate bodies, and then applying to the aggregate an oleic acid and bitumen simultaneously.

AMUND BIRGER CARL DAHLBERG.